United States Patent [19]

Hill

[11] Patent Number: 4,849,984
[45] Date of Patent: Jul. 18, 1989

[54] LARGE VOLUME GASEOUS ELECTRIC DISCHARGE SYSTEM

[76] Inventor: Alan E. Hill, Box 5444A, Rte. 5, Albuquerque, N. Mex. 87123

[21] Appl. No.: 825,152

[22] Filed: Feb. 3, 1986

[51] Int. Cl.$^4$ ............................................. H01S 3/22
[52] U.S. Cl. .................................... 372/58; 372/37; 372/87; 372/90
[58] Field of Search .................... 372/37, 58, 63, 61, 372/87, 88, 90, 92, 60

[56] References Cited

U.S. PATENT DOCUMENTS

| | | | |
|---|---|---|---|
| 3,745,482 | 7/1973 | Patel | 372/60 |
| 3,748,505 | 7/1973 | Lavarini | 372/37 |
| 3,829,792 | 8/1974 | Born et al. | 372/37 |
| 3,860,885 | 1/1975 | McLafferty | 372/58 |
| 3,891,944 | 6/1975 | Lavarini et al. | 372/58 |
| 4,031,485 | 6/1977 | Crane et al. | 372/90 |
| 4,206,429 | 6/1980 | Pinsley | 372/59 |
| 4,321,558 | 3/1982 | Zappa | 372/58 |
| 4,541,097 | 9/1985 | Kuwabara et al. | 372/87 |

OTHER PUBLICATIONS

Hill; "Uniform Electrical Excitation of Large-Volume High-Pressure Near-Sonic $CO_2$-$N_2$-He Flowstream"; Applied Phys. Letters; vol. 18, No. 5, Mar. 1, 1971; pp. 194–197.

Primary Examiner—William L. Sikes
Assistant Examiner—B. Randolph Holloway
Attorney, Agent, or Firm—Donald P. Smith

[57] ABSTRACT

A laser system having a high power output and a large volume gaseous discharge has a plurality of electrodes at each end of a channel to establish a plurality of discharges and a housing arranged to provide a continuous recirculating lasing gas flow through the channel. An ejector connected to a main circulating pump is fixed to discharge into the recirculating lasing gas flow adjacent the channel to mix lasing gas streams and cause diffusion of the gas and thereby provide a uniform plasma flow in the channel. In one embodiment, magnets are arranged to surround the channel to eliminate thermal instabilities, if they arise, and to further homogenize the lasing gas streams and insure their uniformity.

33 Claims, 6 Drawing Sheets

LARGE VOLUME GASEOUS ELECTRIC DISCHARGE SYSTEM

BACKGROUND OF THE INVENTION:

(1) Field of the Invention

One of the problems encountered when a laser system is designed and intended for use in an industrial environment is the compactness, size and reliability of the system. Lasing action in a system is obtained by subjecting a gas-filled vessel or channel to an electric discharge to form plasma; the electrons provided by the discharge collide with active gas molecules thereby exciting them to higher energy levels, from which they descent to lower energy levels and emit excess energy in the form of photons, or light quanta. The density of particles in the higher energy level must exceed that in the lower energy level to achieve optical gain. The addition of oxygen, water vapor, hydrogen and helium to a mixture of carbon dioxide and nitrogen has been found to yield increased output.

An electrical discharge having a large cross sectional area which will uniformly fill large volume cavities regardless of size or shape is mandatory if powerful and reliable lasers suitable for industrial applications are to be developed. An electrical discharge is normally very restricted in diameter because the temperature in different parts of the discharge is not uniform and this results in lower density and higher current at the inside of the plasma column, thus constricting the column. Ballasting the electrodes offers a partial solution by spreading the emission, but the streams tend to recombine. Judicious use and design of aerodynamic forces to control the ion and electron distribution in a large volume discharge have achieved some success and have resulted in a degree of compactness and reduction in size for the same power output, as measured against the very long discharge systems known in the prior art.

(2) Description of the Prior Art

Commercial application of lasers has been limited in the past because of the limitations of poor reliability, poor beam quality and large size and heavy weight. These problems, coupled with the high cost of lasers per watt of output, have caused the machine tool industry and other industries which can use lasers to proceed very slowly in their use. As an example of the size and weight problem, current high power (1 kw and up), continuous wave lasers measure about 22 feet long by 7 feet wide by 5.5 feet high and weigh several tons.

This invention is directed toward solving this problem. It leads to lower manufacturing costs and lower cost per watt of output. The laser embodied herein has high reliability and exceptional beam quality at high power and reduced size and weight.

Lasers are used to reduce production costs in those applications requiring cutting, welding, drilling, heat treating and other processes. However, according to industry publications, laser sales are only about three percent of the machine tool industry. Use of this invention's improved reliability will enable industry to put lasers on industrial production lines. Improved beam quality will make possible industry applications such as hardening or softening metals or adhering materials to one another, which previously could not be economically done. Miniaturization of the structure opens robotics applications, and eventual lower costs will mean more industries can replace other equipment with lasers.

A significant step forward in controlling the ion and electron distribution in an industrial laser discharge to thereby realize large volume uniform plasma generation and control has been achieved according to this invention by pumping a primary lasing gas stream in a recirculating mode in the path of a plurality of spaced high voltage discharges, and introducing a secondary lasing gas stream through a plurality of ejectors into the primary lasing gas stream, thereby effecting turbulance and diffusion of the gas streams, a pressure rise equal to the recirculating mode pressure drop, and an increase in mass flow. Thus the large pump previously needed for state of the art lasers is sharply reduced in size, weight, and capacity, leading to higher system efficiency, lower cost, and lower input energy requirements. It has been found that an exceptional and unusual characteristic of the ejector contributes significantly to the turbulence and diffusion of the lasing gas streams. As the high velocity gas secondary gas stream emerges from the ejector nozzle it enters a mixing tube of generally cylindrical form and the gas from the primary recirculating stream is thus entrained by massive collisions between gas molecules. Vortices result from the collisions and these vortices blend the several streams homogeneously. The angular velocities of the vortices diminish as the blended gases progress downstream. An aerodynamic contour is formed at the exit area of the mixing tube to develop a radial component of flow to the blended gas streams. This yields an homogeneous longitudinal flow in the laser channel with uniform radial velocity distribution.

In the initial reduction to practice of the 5 kw laser structure to be hereinafter described it has been found that the level of plasma control obtained removes constraints on the laser geometry so that large volume cavities can be uniformly filled with plasma, and one can thus design an optimum optical system. The very large and sturdy optical mirrors which can now be used result in a lower flux density and thus prevent warping and destruction from heat. The technology eliminates the necessity for the very delicate, fragile, and expensive optical systems which are not necessarily adaptable to industrial use.

It is expected that the use of plasma control to uniformly fill a large volume cavity will yield a 5 kw laser having dimensions of approximately two feet by two feet by one foot, thus enabling industry to use the laser on a robot arm.

SUMMARY OF THE INVENTION

The invention relates to a method and an apparatus for controlling the lasing gas flow streams in a laser to give a uniform large volume plasma in the laser channels.

It is accordingly a broad object of the invention to provide a laser having a high power output with compact overall dimensions.

It is another object of the invention to provide a uniform large volume plasma in a laser structure.

It is yet another object of the invention to provide a laser system having a high power output and compact size by providing a uniform large volume plasma in the laser channel through diffusing a plurality of lasing gas streams.

It is still another object of the invention to provide a uniform large volume plasma in a laser wherein a plurality of lasing gas streams are diffused by an ejector.

It is yet still another object of the invention to provide a method of pumping a $CO_2$ laser to yield a uniform large volume plasma whereby a primary lasing gas stream flows in a recirculating path and a secondary lasing gas stream is introduced into the primary stream through an ejector, use is made of magnetic fields which cross couple any stray thermal and attachment instabilities to thereby make possible the introduction of greater energy into a given gas volume without an arc resulting.

As more fully disclosed hereinafter, this invention provides a structure and a method for mixing and pumping lasing gas streams in a laser having a primary, recirculating, gas stream, and an ejector to introduce a secondary gas stream to effect diffusion, turbulance, a pressure rise, and an increase in mass flow. Ballast for the discharge streams may be provided by means of the device shown in my U.S. Pat. No. 3,581,146 identified above.

DETAILED DESCRIPTION OF THE INVENTION

Figure 1:
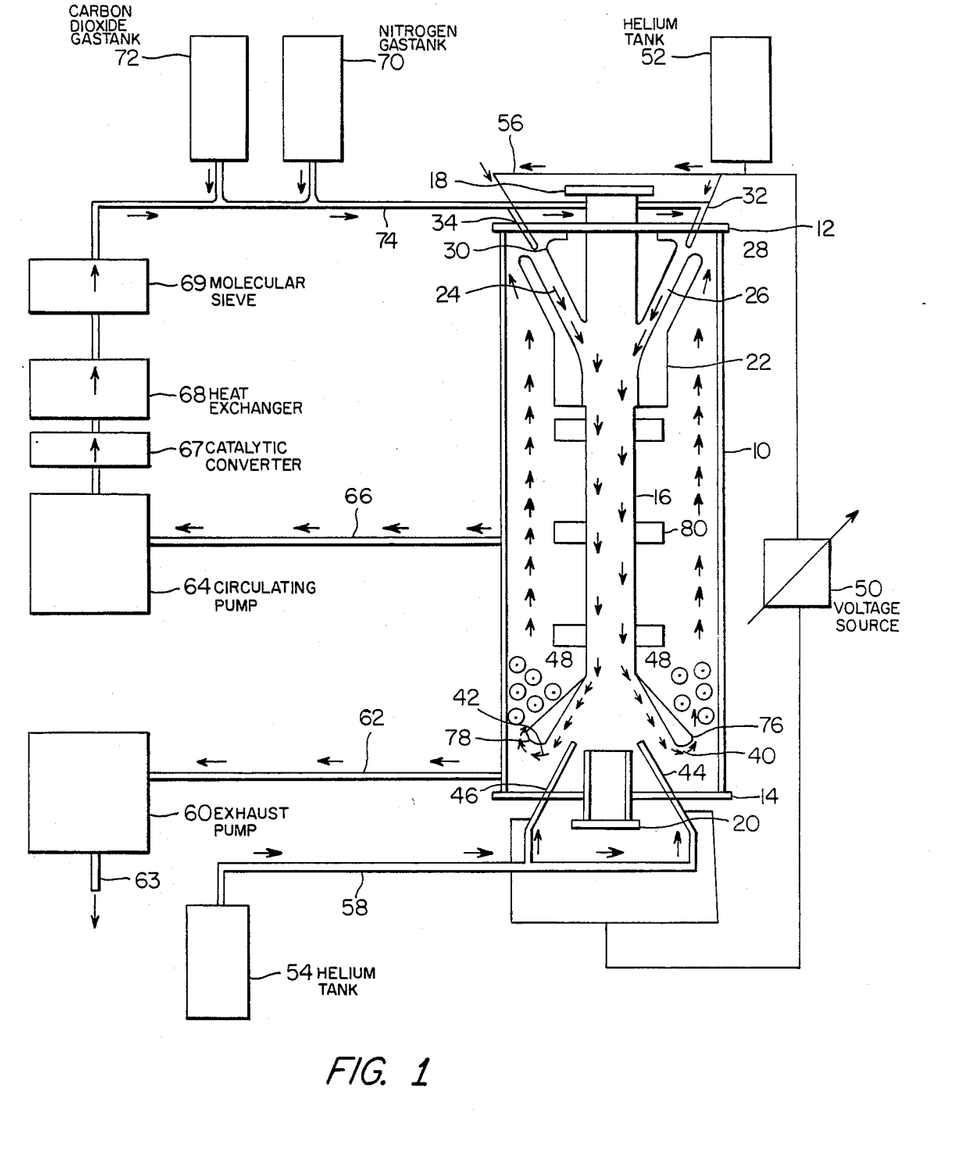
FIG. 1 is a schematic sectional view of a gas laser, looking down from above, according to the invention.
Figure 2:
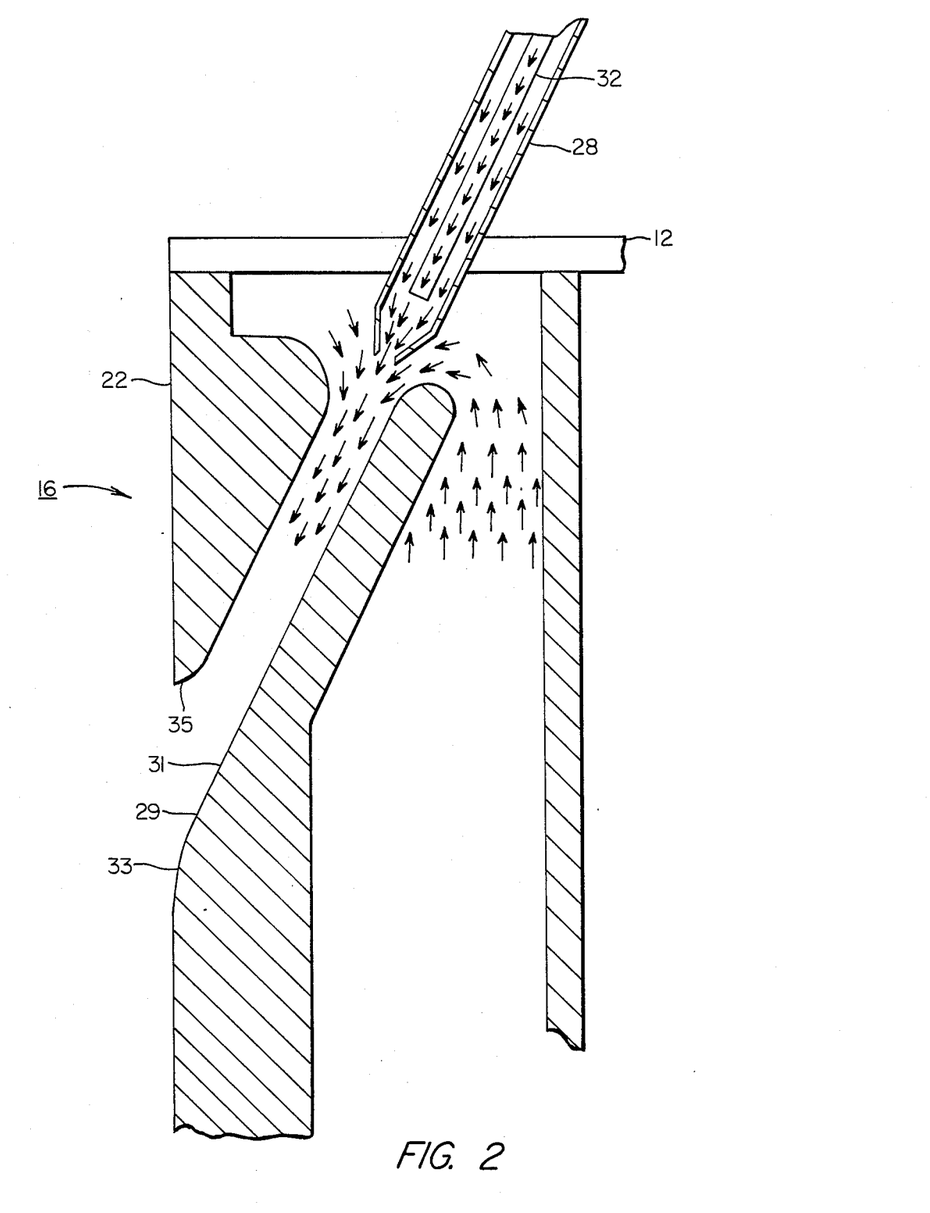
FIG. 2 is a sectional view of a detail of the laser of FIG. 1 showing an ejector diffusing a plurality of lasing gas streams.
Figure 3:
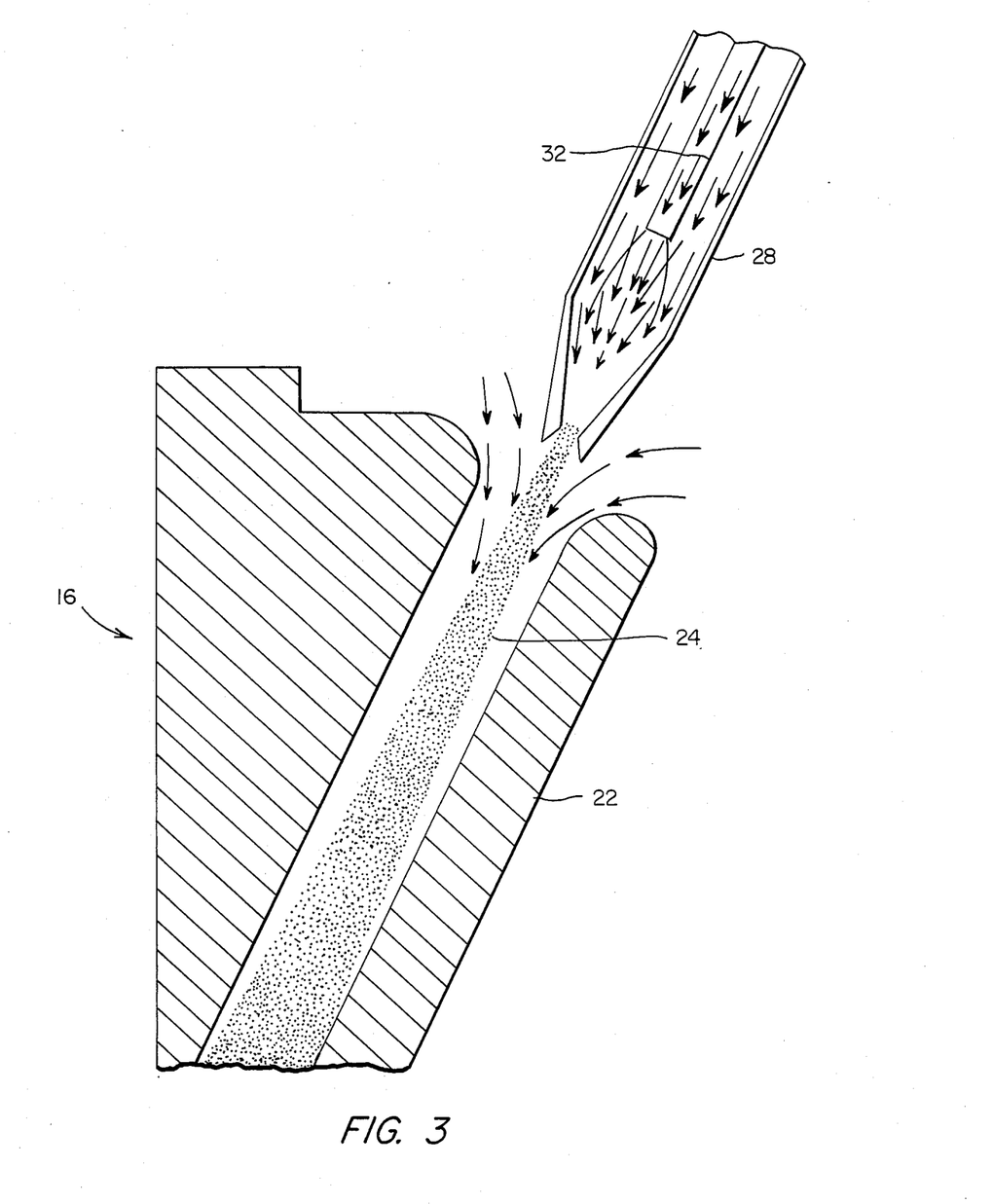
FIG. 3 is a sectional view of a detail of the ejector of FIG. 2 showing the blending of lasing gas streams.
Figure 4:
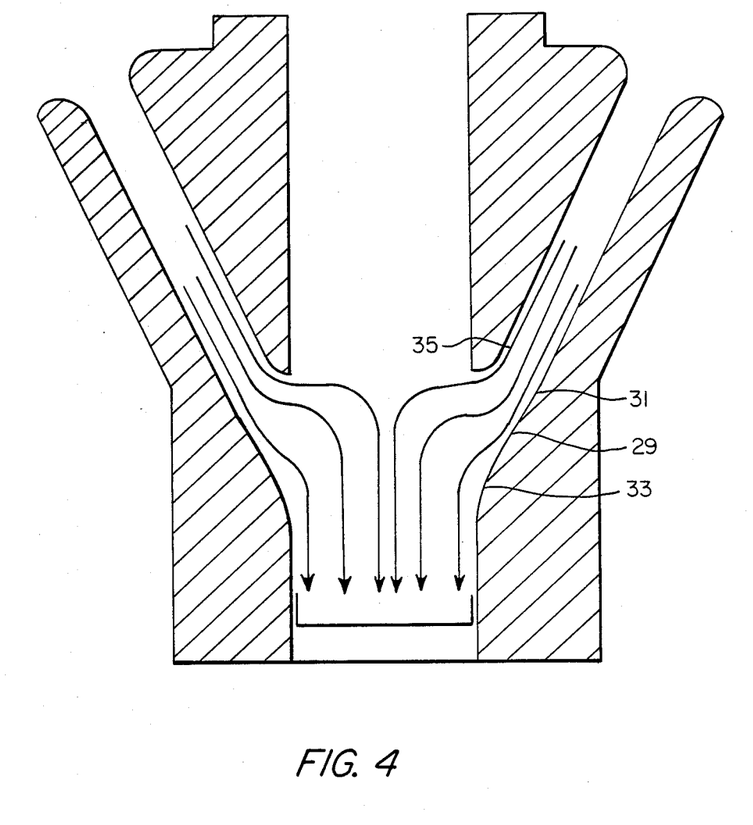
FIG. 4 is a sectional view of a detail of the ejector of FIG. 2 showing the radial component of gas stream and showing the uniform velocity distribution of the lasing gas.

Referring now to FIG. 1 of the drawings which shows a gas laser having the structure shown in more detail in FIGS. 2, 3, and 4. The laser assembly has a cylindrical housing 10 engaging and sealed to end walls 12 and 14. A laser channel 16 is disposed concentric with housing 10, and mirror 18 and output coupler 20 are fixed at each respective end of the channel. Channel 16 is joined to a frustro conical cylindrical member 22 or ejector having a plurality of equally spaced, cylindrical passages or tubes 24, 26 formed at an acute angle with the axis of symmetry of the channel and serving as mixing tubes for the gas streams. Main nozzles 28 and 30 are fixed adjacent to each respective mixing tube. Hollow electrodes 32 and 34 are positioned within and concentric with each respective main nozzle 28, 30 and are connected to a source of high voltage 50 through circuit conductors 56 to provide the electric discharge for lasing action.

FIGS. 2, 3, and 4 show the profile of the mixing tubes and, more specifically, where an aerodynamic contour is formed at the exit area. As viewed in section the tubes terminate on one side in a reverse ogee 29 comprising a first curve 31 blending into a second curve 33, and a radius section 35 opposed to the reverse ogee, and registering with the second curve. This aerodynamic contour is material in the development of a radial component in the gas stream as it exits the mixing tube, and the reaction of the gas stream with the exit contour results in an homogeneous gas flow stream in the contour area and the laser channel with microturbulant, uniform velocity distribution as shown by the flow arrows and wave front profile. Unless the velocity distribution is uniform in cross section, those regions which flow more slowly will become preferentially heated, and these hotter regions become less dense. This leads to an optical disturbance of the laser beam, and can ultimately produce an electric arc.

Laser channel 16 is interrupted as shown by reference characters 40 and 42 to allow a recirculation of gas through the housing and into the mixing tubes as shown by the flow arrows. Hollow electrodes 44 and 46 are connected to voltage source 50 to close the discharge circuit. The arrows in FIGS. 1, 2, 3, and 4 illustrate the gas streams flow. The primary stream is the recirculating stream which flows through channel 16, out interruptions 40 and 42, through the volume between channel 16 and housing 10 and is entrained by the ejectors which introduce a high velocity secondary gas stream and vortices into the mixing tubes as seen in FIG. 3. A series of cylindrical finned heat exchangers shown generally by reference character 48 are positioned adjacent interruptions 40 and 42 to control the lasing gas temperature. Helium under pressure in tanks 52 and 54 is connected to electrodes 32, 34, 44 and 46 by piping shown generally as 56 and 58.

A lasing gas bleed system for optimum continuous and predictable results and to remove impurities including, for example, oil, carbon monoxide, and hydrocarbons from the lasing gas comprises an exhaust pump 60 connected to housing 10 by pipe 62 and having another exhaust pipe 63 leading to an appropriate storage vessel (not shown). A positive-displacement circulating pump 64 is connected to housing 10 by pipe 66 and heat exchanger 68 substantially as shown. Nitrogen gas and carbon dioxide gas under pressure are held in tanks 70 and 72 and are connected to piping 74 and thence to primary nozzles 32 and 34. A catalytic converter 67 by chemical reaction converts any CO formed in the system to $CO_2$. An electric heating system (not shown) is provided to maintain the gas temperature at the proper level for the converter to function. A molecular sieve 69 is provided to prevent the gas from being poisoned by impurities.

A plurality of annular magnets 80 which are shown as permanent magnets embrace laser channel 16 and are longitudinally spaced thereon for a purpose to be later explained.

OPERATION

In the operation of the device the circulator pump 64 establishes a pressure to create a high velocity lasing gas flow through heat exchanger 68 to remove excess heat, piping 74, catalytic converter through the annular array of primary nozzles 28 and 30, through the annular array of mixing tubes 24, 26 into and through laser channel 16, out interruptions 40 and 42, around vanes 76 and 78, past heat exchanges 48 and back into passages 24 and 26 in a recirculating mode flow substantially as shown by the arrows.

The operation of the ejector in mixing and diffusing the lasing gas streams results in a uniform, large volume gaseous discharge in the laser channel. Referring now to the detail drawing of FIGS. 2 and 3 it will be seen that very high velocity gas emerges from each primary nozzle and enters its respective mixing tube. As represented in the figures a relatively conical boundary layer of gas enters the mixing tube and flares outwardly in the tube as it progresses down its length. The gas molecules from the recirculating primary gas stream are entrained by the boundary layer's mass velocity. Gas vortices result from the collisions between gas stream molecules traveling at different velocities and the vortices intimately mix and blend the streams. The annular velocity of the vortices diminish as the blended gas stream move downstream and result in complete diffusion of the gas streams and an homogeneous and uniform gas mixture. In the system actually reduced to practice the cross-sectional area ratio of each respective mixing tube to the throat of each respective primary nozzle is about 27.5 to 1. This ratio is given as an example only and not in a limiting sense because many modifications can be made without departing from the spirit and the intent of the invention.

The laser beam output of the invention emerges to the left of FIG. 1. By a rearrangement of the optical system used the beam output will be made to emerge at a right angle to the axis of channel 16. This system is well and truly shown and illustrated in FIG. 12 of U.S. Pat. No. 3,795,838 issued Mar. 5, 1974. In the embodiment, a horizontally distributed ejector pump array is substituted for the nozzle block shown in FIG. 12 of the above identified patent.

In the closed cycle or recirculating lasing gas mode, contamination of the lasing gas by oil, dust, impurities, ozone, carbon monoxide or chemical reactions within the system gives rise to serious attachment instability problems and will affect system power output and reliability by poisoning the gas. Catalytic converter 67 and molecular sieve 69 prevent the gas from being poisoned. Heat exchanger 68 dissipates heat and thereby cools the lasing gas to optimum temperature. An exhaust pump 60 and its associated plumbing 10, 62, and 63 is provided to allow the composition of the lasing gas to be monitored, as by taking periodic samples, so that the optimum gas mixture can be maintained if necessary by introducing fresh gas from tanks 52, 54, 70, and 72.

Figure 5:
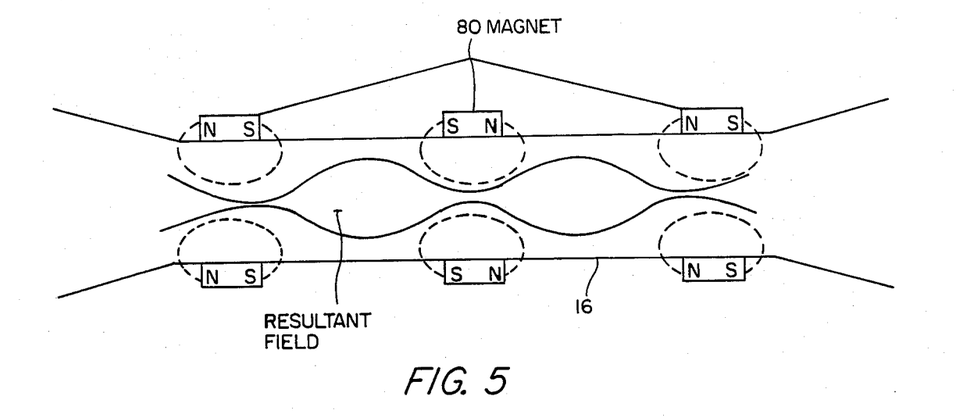
FIG. 5 is a sectional view of a detail of the laser showing one manner of applying magnetic fields to the lasing gas stream.
Figure 7:
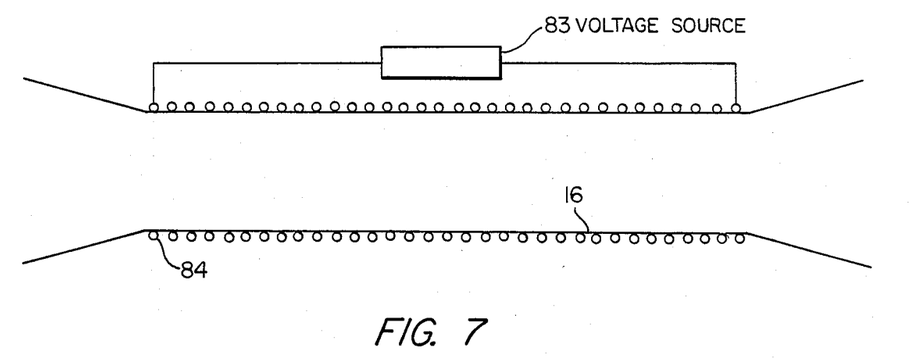
FIG. 7 is a sectional view of a detail of the laser showing yet another manner of applying magnetic fields to the lasing gas stream.
Figure 8:
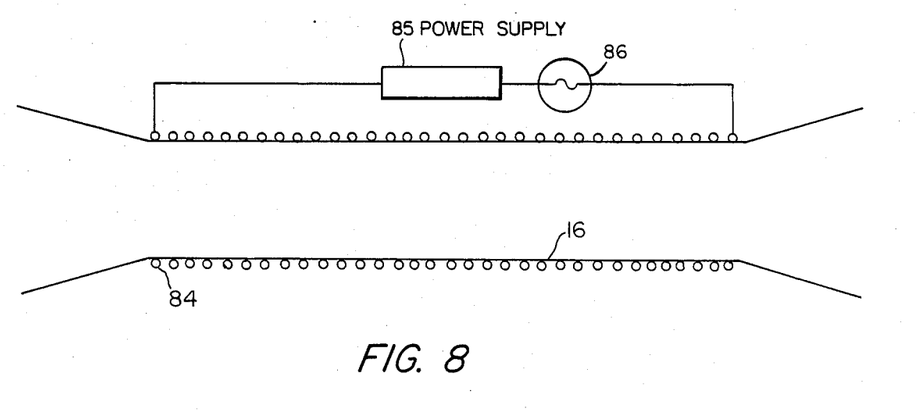
FIG. 8 is a sectional view of a detail of the laser showing still yet another manner of applying magnetic fields to the lasing gas stream.

Referring now to FIGS. 5 and 8 inclusive, it has been found that in the design of an industrial laser wherein continuity of operation and reliability are material factors, the addition of a magnetic field which interacts with the plasma flowstream insures an homogeneous discharge plasma by inhibiting the growth of thermal instabilities within the discharge. Thermal instabilities are incipient arcs which align with the flowstream and unless controlled prevent a laser from delivering its full power output. If an arc develops it could burn and destroy the laser optical system and will short circuit the laser cavity.

FIG. 5 shows the static magnetic field produced by the permanent magnets 80 with poles opposed. The interaction of the field, in this example, with the flowstream does no work and neither adds nor substracts energy from the system. The lines of force produce a static resultant undulating magnetic field which rises and falls in strength or intensity in the direction of plasma flow. As the lasing gas flows it reacts with the undulating magnetic field thus produced and changes the electron flow pattern by giving the electrons a velocity component at right angles to the flow, causing migration of charged particles and mixing of hot and colder regions to thereby prevent the growth of thermal instabilities. A more uniform plasma results.

Figure 6:
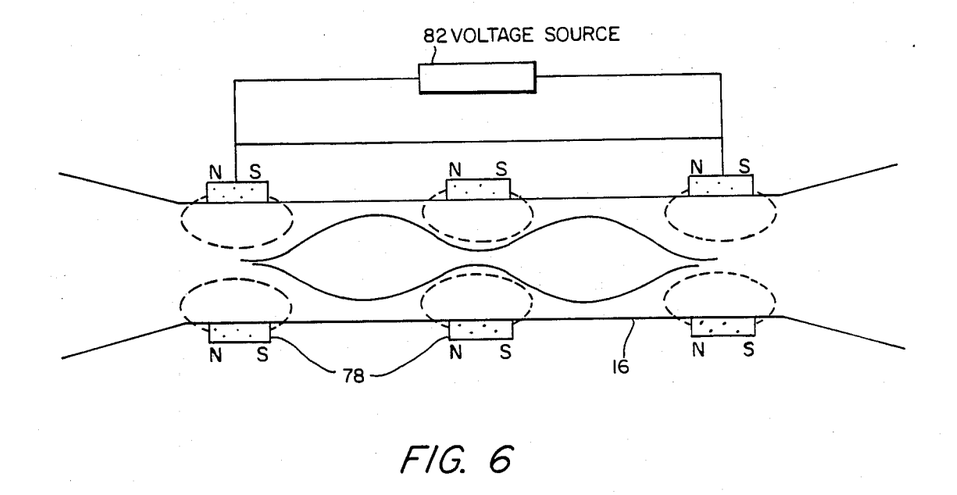
FIG. 6 is a sectional view of a detail of the laser showing another manner of applying magnetic fields to the lasing gas stream.

FIG. 6 shows another species wherein a static magnetic field is produced by D.C. excited electromagnets 78. The field reacts with the lasing gas as in the preceding example and thus changes the electron flow pattern to yield an homogeneous plasma. It follows, however, that the magnetic field produced by voltage source 82 is variable in intensity and can be controlled externally by controlling the applied D.C. voltage.

The species of FIG. 7 shows an elongated electromagnet 84 embracing a substantial segment of the channel 16. When excited by a D.C. voltage source 83 an axially uniform distributed magnetic field results which prevents development of thermal instabilities by distributing the magnetic lines of force in the direction of the lasing gas flowstream. The action of this field will prevent thermal instabilities by guiding the charged particles in substantially parallel paths in the laser channel.

The species of FIG. 8 shows an oscillator 86 which superimposes an A.C. field upon the D.C. field from power supply 85. The interaction of the two energy sources with the distributed coil 84 creates an undulating magnetic field at right angles to the direction of lasing gas flow. The work to compress and expand the field is supplied by the oscillator and causes a radial direction of motion of charged particles to homogenize the gas. To avoid standing wave-patterns, the oscillator frequency must exceed the gas flow-through time several fold.

There is thus provided a high power laser gaseous discharge system which has high reliability and exceptional beam quality at high power and reduced size and weight. It will be apparent to those skilled in the art that many changes may be made in the construction and arrangements of parts without necessarily departing from the scope of the invention as defined in the appended claims.

I claim:

1. A laser system having a high power output comprising an enclosing housing, a gas lasing medium in said housing, a laser channel in said housing, means for providing continuous recirculating flow of the gas lasing medium through said housing and said channel, a plurality of electrodes at the upstream end of said housing adjacent one end of said channel, a plurality of electrodes at the downstream end of said housing adjacent the other end of said channel, a source of voltage connected to said electrodes for establishing and maintaining discharges in said channel, diffusing means to provide a uniform plasma flow in said channel and to provide a pressure rise to balance the pressure drop from recirculating flow through said housing and channel, and means to draw forth a beam of light energy from said channel, said diffusing means comprising an ejector disposed downstream from each respective upstream electrode for mixing and diffusing gas streams into the said laser channel.

2. A laser system, as set forth in claim 1, including a heat exchanger disposed intermediate the laser channel and the housing whereby the continuous recirculating flow of the gas lasing medium passes through the heat exchanger.

3. The invention according to claim 1 wherein each said ejector comprises a primary nozzle and a mixing tube, each said primary nozzle connected to a source of lasing gas pressure external to said housing, the said nozzle positioned to discharge into the mixing tube.

4. The invention according to claim 3 including an aerodynamic contour formed at the exit area of said mixing tube.

5. The invention according to claim 4 wherein the said aerodynamic contour comprises a reverse ogee curve on one side and a straight section on the other side to impart a radial component to the gas stream flow upon exit.

6. The invention according to claim 4 including means surrounding said laser channel to generate magnetic fields to cross couple thermal and attachment instabilities.

7. The invention according to claim 6 wherein said means comprises a plurality of electromagnets spaced longitudinally on said channel, and a source of direct current voltage connected to the said electromagnets.

8. The invention according to claim 7 wherein the cross sectional area ratio of each respective mixing tube to the throat of each respective primary nozzle is about 27.5 to 1.

9. The invention according to claim 6 wherein said means comprises a plurality of annular permanent magnets spaced longitudinally on said channel and embracing the said channel.

10. The invention according to claim 9 wherein each said electrode has a passage formed therein and is disposed in concentric relation within each said primary nozzle and is connected to a source of helium gas to introduce metastable helium atoms into the gas streams.

11. The invention according to claim 10 wherein said means to draw forth a beam of light energy from the channel comprises a pair of mirrors disposed in a mutually facing relation and fixed one at each end of said channel to direct an output beam in an direction parallel to said channel.

12. The invention according to claim 10 wherein said means to draw forth a beam of light energy comprises an optical system arranged to direct the output beam in a direction transverse to lasing gas flow to reflect an output beam in a direction transverse to said channel.

13. That method of mixing lasing gas streams for pumping a $CO_2$ laser having a plurality of parallel discharges between electrodes to give a uniform large volume gaseous discharge in a laser channel, comprising the steps of guiding a primary lasing gas stream in a recirculating path wherein a pressure drop results, and introducing a secondary lasing gas stream at a higher pressure into the said first gas stream to effect diffusion of the streams, and a pressure rise equal to the recirculating path pressure drop and an increase in mass flow through the channel.

14. The method of claim 13 including the step of introducing a third gas stream of helium through said electrodes to introduce metastable helium atoms into the gas streams and to inhibit metal sputtering.

15. A method of mixing lasing gas streams for pumping a $CO_2$ laser having a plurality of parallel discharges between electrodes to give a uniform volume gaseous discharge in a laser channel, comprising the steps of:
guiding a primary lasing gas stream in a recirculating path wherein a pressure drop results;
introducing a secondary lasing gas stream at a higher pressure into the first gas stream to effect diffusion of the streams, a pressure rise equal to the recirculating path pressure drop, and an increase in mass flow through the channel.

16. A method, as set forth in claim 15, including the step of introducing a third gas stream of helium through the electrodes to introduce metastable helium atoms into the gas streams and to inhibit metal sputtering.

17. A laser system having a high power output comprising a housing having a gas lasing medium therein, a laser channel in the housing, means for providing continuous recirculating flow of the gas lasing medium through the channel, an electrode at one end of the channel, an electrode at the other end of the channel, a source of electrical power connected to the electrodes for establishing and maintaining discharges in the laser channel, means for providing a plasma flow in the channel, and means surrounding the laser channel for generating magnetic fields to cross couple thermal and attachment instabilities.

18. A laser system, as set forth in claim 17, wherein the magnetic field means includes a plurality of annular permanent magnets spaced longitudinally along the laser channel.

19. A laser system, as set forth in claim 17, wherein the magnetic field means includes a plurality of electromagnets spaced longitudinally along the laser channel and a source of D.C. voltage connected to the electromagnets.

20. A laser system, as set forth in claim 17, wherein the magnetic field means includes an electromagnet positioned about a substantial segment of the laser channel.

21. A laser system, as set forth in claim 18, wherein each of the permanent magnets is positioned adjacent the permanent magnet of opposing polarity.

22. A laser system, as set forth in claim 19, wherein each of the electromagnets is connected to the source in opposing polarity so that adjacent electromagnets are of opposing polarity.

23. A laser system, as set forth in claim 20, wherein the electromagnet is connected to a D.C. voltage source.

24. A laser system, as set forth in claim 23, including an oscillator connected in series intermediate the electromagnet and the D.C. voltage source.

25. A laser system, as set forth in claim 24, wherein the oscillator operates at a frequency directly related to the rate of the recirculating flow.

26. A laser system for providing a uniform large volume gaseous discharge, comprising:
a housing;
a laser channel being influidic communication with the housing and forming a primary recirculating gas flow stream through the housing and the laser channel;
a gaseous lasing medium contained within the housing and laser channel; and
means for pressurizing only a portion of the gaseous lasing medium and delivering the pressurized portion of the gaseous lasing medium via a secondary recirculating gas flow stream into the laser channel at a preselected velocity substantially greater than the velocity of the primary recirculating gas.

27. A laser system, as set forth in claim 26, wherein the means includes at least one ejector having a mixing tube connected intermediate the laser channel and housing forming a portion of both the primary and secondary gas flow streams, a primary nozzle fixed adjacent to the mixing tube and adapted for delivering the secondary gas flow into the mixing tube, and a pump fluidicly connected between the primary gas flow stream and the primary nozzle.

28. A laser system, as set forth in claim 27, wherein the ratio of the cross sectional areas of the mixing tube and nozzle 30 have a ratio of approximately 27.5 to 1.

29. A laser system, as set forth in claim 27, including the laser channel having an axis of symmetry substantially parallel to the primary gas flow stream wherein the mixing tube opens into the laser channel at an acute angle with the axis of symmetry.

30. A laser system, as set forth in claim 27, wherein the means includes a plurality of ejectors equally spaced about the laser channel and having a plurality of mixing tubes and primary nozzles connected to the pump.

31. A laser system, as set forth in claim 29, wherein the mixing tube includes an aerodynamic contour on an inner surface of the mixing tube adjacent the opening into the laser channel.

32. A laser system, as set forth in claim 31, wherein the aerodynamic contour includes the inner surface of the mixing tube having a reverse ogee adjacent the downstream connection of the mixing tube and laser channel and a radius section opposed to the reverse ogee adjacent the upstream connection of the mixing tube and laser channel.

33. A laser system, as set forth in claim 32, where the reverse ogee includes the inner surface of the mixing tube having first and second curved surfaces, the first surface being curved at a first preselected radius in a direction extending radially outward from the longitudinal center of the mixing tube, and the second surface being curved at a second preselected radius in a direction radially inward toward the longitudinal center of the mixing tube, the second curved surface being intermediate the laser channel and the first curved surface.

* * * * *